United States Patent
Matsushita et al.

(10) Patent No.: US 7,906,022 B2
(45) Date of Patent: Mar. 15, 2011

(54) DIESEL FILTER

(75) Inventors: Yoshiharu Matsushita, Oyama (JP); Suminobu Otsubo, Toyota (JP); Yasuji Nishi, Toyota (JP); Satoshi Nagata, Nisshin (JP)

(73) Assignees: Kyosan Denki Co., Ltd., Koga (JP); Toyota Jidosha Kabushiki Kaisha, Toyota (JP)

( * ) Notice: Subject to any disclaimer, the term of this patent is extended or adjusted under 35 U.S.C. 154(b) by 1125 days.

(21) Appl. No.: 11/583,779

(22) Filed: Oct. 20, 2006

(65) Prior Publication Data

US 2007/0090037 A1    Apr. 26, 2007

(30) Foreign Application Priority Data

Oct. 24, 2005    (JP) ................................. 2005-308074

(51) Int. Cl.
*B01D 27/08*    (2006.01)
*B01D 35/30*    (2006.01)

(52) U.S. Cl. ......... 210/232; 210/249; 210/450; 210/444

(58) Field of Classification Search .................. 210/232, 210/249, 444, 450
See application file for complete search history.

(56) References Cited

U.S. PATENT DOCUMENTS

| 1,456,883 | A | * | 5/1923 | Deeks ........................... 210/312 |
| 5,213,682 | A | * | 5/1993 | Richardson .................... 210/86 |
| 5,484,527 | A |  | 1/1996 | Janik et al. |
| 6,224,439 | B1 |  | 5/2001 | Sato et al. |
| 2007/0090037 | A1 | * | 4/2007 | Matsushita et al. ........... 210/232 |

FOREIGN PATENT DOCUMENTS

| EP | 0 657 201 A2 | 6/1995 |
| GB | 2 272 652 A | 5/1994 |
| JP | U-55-2476 | 12/1974 |
| JP | A-07-208292 | 8/1995 |
| JP | A-2005-103358 | 4/2005 |

OTHER PUBLICATIONS

"Dieselkraftstoff-Filter mit austauschbarem Einsatz," *MTZ Motortechnische Zeitschrift*, Vieweg Verlag, Wiesbaden, Germany, vol. 56, No. 7/8, p. 411, Jul. 1, 2005.

Office Action issued in Japanese Patent Application No. 2005-308074; mailed Sep. 30, 2008. (with translation).

* cited by examiner

*Primary Examiner* — Thomas M Lithgow (74) *Attorney, Agent, or Firm* — Oliff & Berridge, PLC

(57) ABSTRACT

A diesel filter includes a case, a cap for closing the opening of the case, an element housed in the case, and an attachment member having a holding portion and a bracket. The attachment member and the cap hold the case therebetween. The bracket is provided to fix the diesel filter to a predetermined portion. The cap can be detached in a state where the attachment member is fixed to the predetermined portion by the bracket, so that the element can be replaced in the same state.

10 Claims, 9 Drawing Sheets

DIESEL FILTER

INCORPORATION BY REFERENCE

The disclosure of Japanese Patent Application No. 2005-308074 filed on Oct. 24, 2005 including the specification, drawings and abstract is incorporated herein by reference in its entirety.

BACKGROUND OF THE INVENTION

1. Field of the Invention

The invention relates to a diesel filter provided in a fuel supply system of a vehicle and the like, particularly to a diesel filter that enables replacement of elements and the like without removing a fixed portion of a vehicle body and the like.

2. Description of the Related Art

Diesel engines have long been used as engines for vehicles and the like. In a diesel engine, a diesel filter filters light oil in a fuel tank, and an injection pump compresses the filtered fuel to a high pressure, and an injector injects the fuel to a combustion chamber of the engine so that the fuel is burned in the combustion chamber.

Incidentally, fuel includes foreign matters, for example, water, dust, and solid undesirable materials such as rust. These foreign matters need to be removed because inclusion thereof results in reduced combustion efficiency and wear of the injector or the like. Diesel filters are, therefore, provided to deal with such problems. More specifically, water content in fuel includes dissolved water and free water. Dissolved water causes no negative effects, because it flows smoothly in fuel channels and is consumed together with fuel. Meanwhile, free water may cause some problems as follows. Free water appears in fuel when: rainwater intrudes into the fuel during fueling; water droplets formed by moisture in the air intrude into the fuel; or the water dissolved in the fuel is separated therefrom due to a decrease in fuel temperature. Such free water is large in specific gravity compared to light oil, so that it stagnates in the injection pump and the like, thus generating rust and stick. For this reason, free water particularly needs to be removed using a diesel filter.

A diesel filter related to the invention will be described. A diesel filter includes a cup-shaped case forming an outer shell, and a cap detachably attached to an upper open end of the case.

The cap is provided with a fuel supply pipe and a fuel discharge pipe, through which fuel is supplied and discharged. Integrally formed with the top surface of the cap is a bracket for fixing the diesel filter to a predetermined portion of a vehicle body. By attaching attachment parts, such as fasteners, to attachment holes formed in the bracket, the diesel filter is fixed to the predetermined portion of the vehicle body.

Housed in the case is a filter member that includes an element having a fuel passage at the center thereof, and an upper and lower holding members for holding the upper and lower ends of the element. A water reservoir is formed below the filter member.

Fuel is introduced into the water reservoir through the fuel supply pipe and the fuel passage. In the water reservoir, free water contained in the fuel is separated from the fuel. Then, the fuel reverses its direction and moves upward, and passes through the element, so that foreign matter contained in the fuel is removed. The fuel free from foreign matter is then discharged from the fuel discharge pipe. The separated water has a larger specific gravity than the fuel, therefore the water is retained in the water reservoir. When the volume of the retained water reaches a predetermined value or more, a drain cock is opened to discharge the water. As described above, the diesel filter is provided with the water reservoir at a lower portion thereof, so that the diesel filter is fixed to the predetermined portion of the vehicle body in an upright manner. Other parts are provided around and below the diesel filter (see Japanese Patent Application Publication No. JP-A-7-208292) so as to be closely adjacent.

Note that the diesel filter needs to be replaced after a predetermined period of time because of clogging of the element. As described above, the diesel filter 1 is surrounded by the other parts arranged around and below the diesel filter. Therefore, when replacing the element with a new one, the bracket is first detached from the vehicle body, and the diesel filter is then pulled up to be removed from where it was installed. The removed diesel filter is then disassembled for replacing the element. In this manner, replacing the element inevitably involves disassembly, which has been a problem.

When the diesel filter includes a level detector for detecting the volume of water in the water reservoir, a wiring member including a harness, a connector, or the like, to which the level detector is connected, is normally attached to the cap or to a particular portion in the vehicle body side. In this case, the wiring member, e.g., a connector, needs to be removed from the cap or the portion in the vehicle body side before removing the bracket 6 from the vehicle body. Accordingly, the number of man-hours required for the replacement work increases, resulting in poor workability.

SUMMARY OF THE INVENTION

It is an object of the invention to provide a diesel filter in which a detachable cap is provided so that replacement of an element and the like can be performed without removing a bracket fixed to a predetermined portion of a vehicle body and the like, thereby improving replacement workability of the element and the like.

To accomplish the above-described object, the invention employs the following arrangement.

A diesel filter according to a first aspect of the invention includes a case, a cap that closes the opening of the case, an element housed in the case, and an attachment member having a holding portion that is sandwiched between the case and the cap and holds a part of the case, and a bracket which is connected with the holding portion and via which the diesel filter is fixed to a predetermined portion. The cap can be attached and detached in a state where the attachment member is fixed to the predetermined portion via the bracket. Thus, the element can be easily replaced. It is therefore possible to reduce the number of man-hours required for replacement of the element and the like, and thus the time for the entire replacement work.

The holding portion may constitute a wall for reinforcing the case. With the reinforcing wall, the thickness of the case and the like can be reduced, and the diesel filter is protected when impact is applied from the outside.

The holding portion may include a guide portion By providing the guide portion, the cap and the case can be easily positioned and attached to each other.

The cap may include a water-intrusion preventing wall. Providing the water-intrusion preventing wall suppresses or prevents water intrusion into the case from between the cap and the case.

A notch may be formed at a portion of the water-intrusion preventing wall. By providing the notch, whether the cap and the case are correctly attached to each other can be easily confirmed.

A wiring member may be attached to the attachment member. With this arrangement, the replacement of the element and other can be performed without removing a wiring member including a connector, a harness, or the like.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
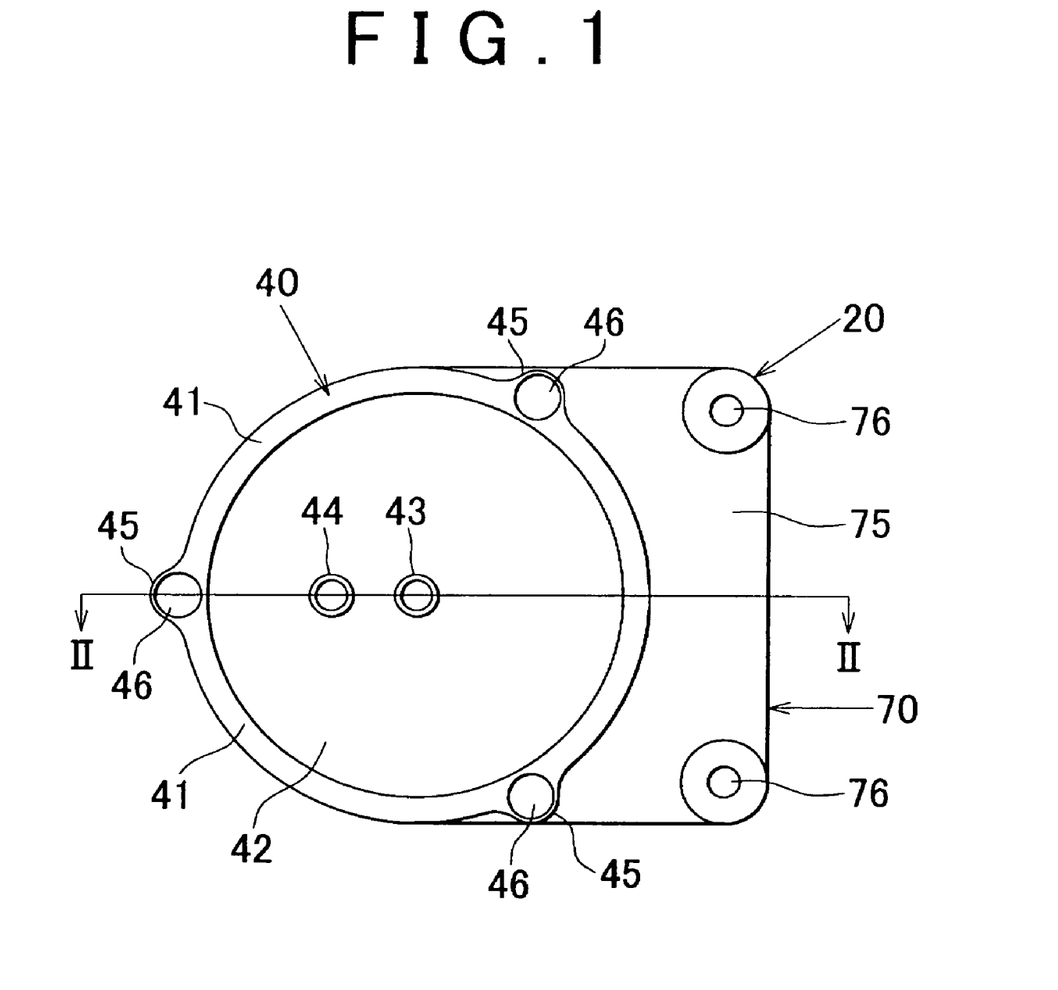
FIG. 1 is a plan view of a diesel filter.
Figure 2:
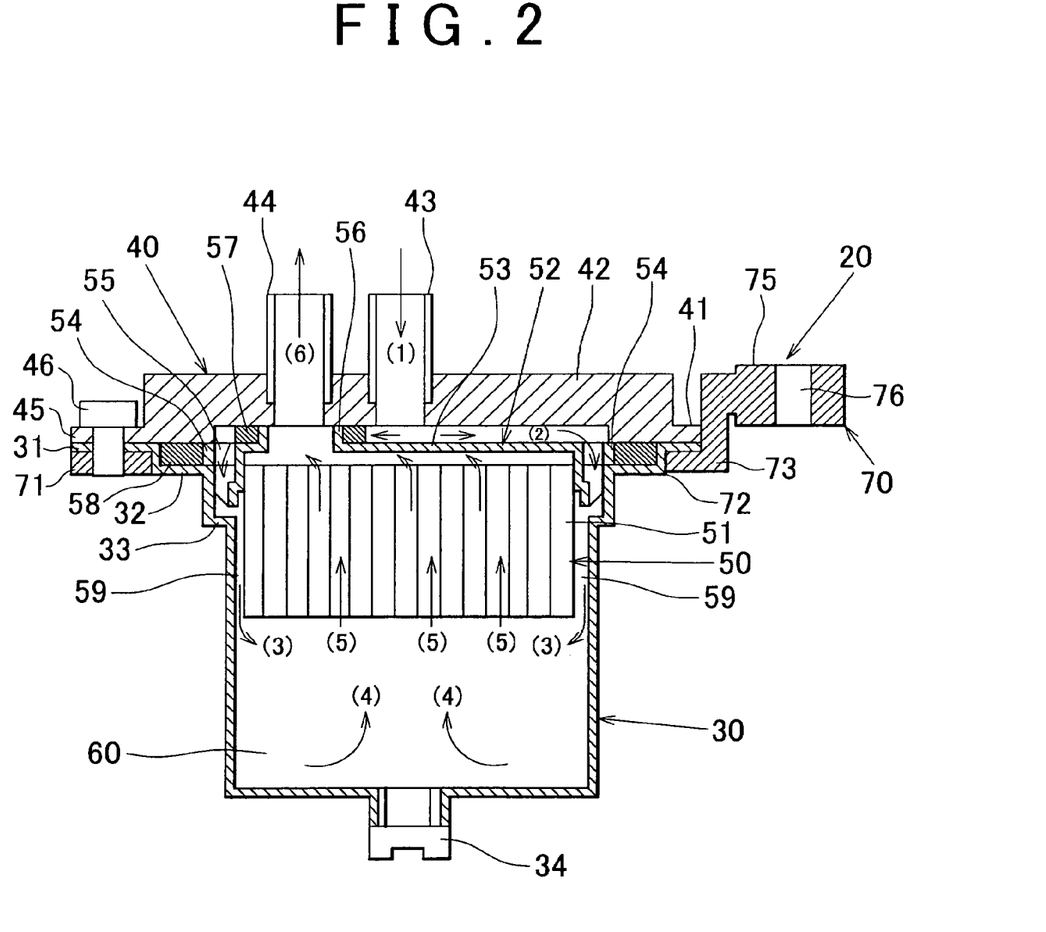
FIG. 2 is a cross sectional view taken along line II-II in FIG. 1.

FIG. 1 shows a plan view of a diesel filter. FIG. 2 shows a cross sectional view taken along line II-II in FIG. 1. The diesel filter according to the invention may be employed in a fuel system of any machine, for example, a vehicle, construction machine, forklift, generator, and the like. In the following, however, a diesel filter used in a fuel system of a vehicle will be described.

A diesel filter 20 includes a cup-shaped case 30 forming an outer shell, a cap 40 for closing an upper opening of the case 30, a filter member 50 housed in the case 30, and an attachment member 70 for coupling the case 30 and the cap 40 and fixing the diesel filter 20 to a predetermined portion of a vehicle body.

The case 30 is a hollow cylindrical member made of metal having an opening in the upper side. A horizontal ring-shaped upper stepped portion 31 is formed such that it outwardly protrudes from the upper end of the case 30. A horizontal ring-shaped middle stepped portion 32 having a diameter smaller than that of the upper stepped portion 31 is formed below the upper stepped portion 31. A horizontal ring-shaped lower stepped portion 33 having a diameter smaller than that of the middle stepped portion 32 is formed below the middle stepped portion 32. Further, the case 30 houses the cylindrical filter member 50 such that the lower end of the filter member 50 is lower than the lower stepped portion 33, and a water reservoir 60 is formed below the filter member 50.

Provided at the bottom of the case 30 is a drain cock 34 that is opened when the volume of water in the water reservoir 60 reaches a predetermined value or more so as to discharge the retained water. The discharge of the water is performed, for example, in such a manner that a water level detector, such as a float switch, is provided in the water reservoir 60, and the water is discharged manually or automatically in accordance with signals received from the detector.

In a case where the case 30 is made of metal, impact resistance of the case is enhanced, so that the case can be arranged even at the bottom of the vehicle, which is likely to be hit by road debris, such as pebbles, thrown by the tires. Note that, if an installation space suitable for impact resistance is secured, the case 30 may be made of plastic instead of metal.

The cap 40 is a metallic member having a hat-shaped cross section. The cap 40 includes a ring-shaped flange 41 at the outer periphery thereof, and a dish-shaped body 42 at the center thereof. On the top surface of the body 42, a fuel supply pipe 43 and a fuel discharge pipe 44 are provided. Fuel in a fuel tank (not shown) is supplied through the fuel supply pipe 43, and filtered fuel is fed to a fuel injection pump (not shown) through the fuel discharge pipe 44.

The ring-shaped flange 41 includes three fastening portions 45 each having an anttachment hole as shown in FIG. 1. Fasteners 46 are inserted into the attachment holes in the fastening portions 45 and tightened to the attachment member 70. Note that the cap 40 is made of metal in the above description, however it may be made of plastic.

The filter member 50 includes an element 51 and an element-holding member 52. The element 51 is a cylindrical member formed by bonding a plain filter element and a wavy filter element and then winding the bonded filter elements. In the element 51, fuel passages are arranged in the up-and-down direction. With this arrangement, fuel flows through many passages formed in the element 51, thereby catching foreign matter contained in the fuel by means of the filter elements. The outer diameter of the element 51 is made smaller than the inner diameter of the water reservoir 60 of the case 30, and when the element 51 is housed in the case 30, a fuel passage 59 is defined therebetween.

The element-holding member 52 is an integrally formed plastic member, and includes a body 53 and a flange member 54. A plurality of communication holes 55 are coaxially provided at equal intervals, and in the vertical direction, between the body 53 and the flange member 54. The body 53 is a dish-shaped member that has an opening at the bottom side. The inner diameter of the body 53 is substantially the same as the outer diameter of the element 51. The element 51 is inserted into the body 53, and bonded to the body 53 water-tightly with an adhesive.

Further, a tubular-shaped opening 56 for fuel outlet is formed on the top surface of the body 53 at a position facing the fuel discharge pipe 44 provided in the cap 40. A first sealing material 57, which is ring-shaped, is arranged around the outer periphery of the opening 56 for fuel outlet. When the opening of the case 30 is closed by the cap 40, the first sealing material 57 is sandwiched between the bottom surface of the cap 40 and the top surface of the element-holding member 52, thereby sealing between the fuel supply side and the fuel discharge side.

The flange member 54 is a ring-shaped member, and the bottom surface thereof is placed on the top surface of the middle stepped portion 32. When closing the opening of the case 30 by the cap 40, a second sealing material 58 is put on the middle stepped portion 32 of the case 30, and then, the flange member 54 is put on the middle stepped portion 32 to the inner side of the second sealing material 58. Thus, the second sealing material 58 is sandwiched between the bottom surface of the cap 40 and the top surface of the middle stepped portion 32 to form a sealed portion. The flange member 54 is also sandwiched between the bottom surface of the cap 40 and the top surface of the middle stepped portion 32, whereby the filter member 50 is held in position within the case 30.

When the flange member 54 is sandwiched between the bottom surface of the cap 40 and the top surface of the middle stepped portion 32, the communication holes 55 formed between the flange member 54 and the body 53 are located above the lower stepped portion 33 of the case 30. The fuel supplied from the fuel supply pipe 43 is introduced to the water reservoir 60 through the communication holes 55 and the fuel passage 59 formed at the outer periphery of the element 51.

The outer peripheral surface of the element-holding member is provided with a flange having notches for allowing the fuel to flow therethrough. When the opening of the case is closed by the cap, the flange is held by the cap and the case. Thus, the structure for holding the filter member can be simplified, leading to further reduction in production cost. Further, it is possible to prevent the sealing material (the second sealing material 58) from being cut by excessive compression due to deformation of the case that is caused by collision (impact) and groove formation for retaining the sealing material (the second sealing material 58). Thus, fuel leakage can be prevented.

The attachment member 70 is made of metal or plastic and includes a holding portion 71, a connecting portion 73, and a bracket 75. The attachment member 70 has a forward-round and backward-square shape in top view, and is crank-shaped in longitudinal cross section. The holding portion 71 is a ring-shaped flat plate having a circular opening 72 at the center thereof. The bracket 75 is a generally square-shaped flat plate and placed above the holding portion 71. Two attachment holes 76 are formed at the ends of the bracket 75 on the opposite side of the holding portion 71. The connecting portion 73 connects the holding portion 71 and the bracket 75. The connecting portion 73 extends vertically, and is arc-shaped in transverse section. The attachment member 70 is fixed to a predetermined portion of the vehicle body by inserting a fastener (not shown) to each of the attachment holes 76.

The diesel filter 20 is assembled in the following manner. Firstly, the middle stepped portion 32 of the case 30 is fit into the opening 72 formed in the holding portion 71 of the attachment member 70. Secondly, the second sealing material 58 is put on the middle stepped portion 32 of the case 30, and the filter member 50 is inserted into the case 30, thereby placing the flange member 54 of the element holding-member 52 on the middle stepped portion 32. Thereafter, the cap 40 is put on the element-holding member 52, whereby the first sealing material 57 put on the outer periphery of the opening 56 for fuel outlet is sandwiched between the element-holding member 52 and the cap 40. After the cap 40 is put on the element-holding member 52, the fasteners 46 are attached to the fastening portions 45 of the flange 41.

Thread holes are formed in the holding portion 71 of the attachment member 70, and the fasteners 46 are tightened to these thread holes, respectively. As the fasteners 46 are tightened, the upper stepped portion 31 of the case 30 is clamped between the flange 41 of the cap 40 and the holding portion 71 of the attachment member 70, whereby the case 30 and the cap 40 are water-tightly attached to the attachment member 70. In this way, the diesel filter 20 is assembled.

When the filter member 50 is housed in the case 30, the element 51 occupies generally half the depth of the case 30, so that the water reservoir 60 is formed below the element 51 and the fuel passage 59 is formed between the inner surface of the case 30 and the outer peripheral surface of the element 51. Further, the fuel supply pipe 43 is placed substantially at the center of the filter member 50, while the fuel discharge pipe 44 is offset from the center of the filter member 50.

The fuel introduced from the fuel supply pipe 43 into the diesel filter 20 as shown by arrow (1) is dispersed in all directions over the top surface of the filter member 50. Then, the fuel flows down to the fuel passage 59 formed between the inner surface of the case 30 and the outer peripheral surface of the element 51 as shown by arrow (2), and is introduced to the water reservoir 60 as shown by arrows (3). Water content of the fuel is separated from the fuel in the water reservoir 60, and the fuel free from the water content moves upward as shown by arrows (4). Then, the fuel passes through the element 51 as shown by arrows (5), so that foreign matter contained in the fuel is removed. After removal of the foreign matter, the fuel is discharged via the fuel discharge pipe 44 as shown by arrow (6).

When replacing the filter member 50 including the element 51 and others, the replacement work of the diesel filter 20 is performed in the reverse order of its assembly without removing the attachment member 70, as follows. First, the three fasteners 46 are removed from the diesel filter 20 from above. Next, after removing the cap 40, the filter member 50 is removed and replaced with a new one. Then, the cap 40 is put back on the case 30, and the three fasteners 46 are tightened. The replacement work is thus completed. If the case 30 has some defect such as a dent, the case 30 is also replaced. If the case 30 and the filter member 50 are of a cartridge type filter in which the case 30 and the filter member 50 are integrally formed or assembled, the entire cartridge is replaced with a new one.

As described above, according to the diesel filter 20 of a first embodiment, the attachment member 70 is structured to hold the case 30 and the cap 40, and to be used to fix the diesel filter 20 to the vehicle body. Thus, the replacement of the filter member 50 including the element 51 and others can be performed in a short time with reduced man-hours.

Figure 3:
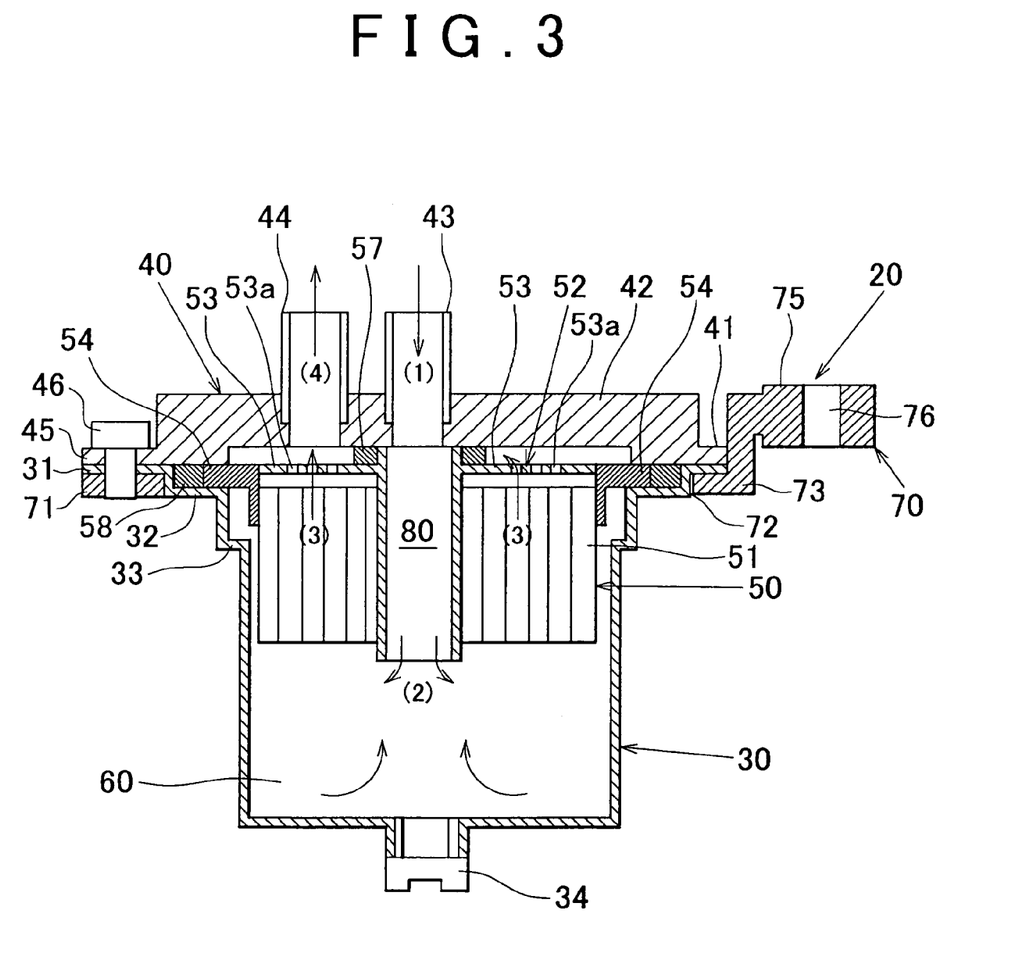
FIG. 3 is a cross sectional view of another diesel filter.

FIG. 3 is a cross sectional view showing a diesel filter according to a second embodiment. In the first embodiment, a side-flow diesel filter is employed in which fuel introduced from the fuel supply pipe is supplied to the water reservoir through the fuel passage formed at the outer periphery of the element. Meanwhile, in the second embodiment, a center-flow diesel filter is employed in which fuel is supplied to the water reservoir through a fuel passage formed in the center of the element. Note that the case 30, cap 40, attachment member 70, and so on, which are equivalent to those in the first embodiment are denoted by like reference numerals and detailed description thereof will be omitted, and a description will be mainly made of different parts.

A diesel filter 20 includes a cup-shaped case 30 forming an outer shell, a cap 40 for closing an upper opening of the case 30, a filter member 50 housed in the case 30, and an attachment member 70 for coupling the case 30 and the cap 40 and fixing the diesel filter 20 to a predetermined portion of a vehicle body, as in the first embodiment.

The filter member 50 including an element 51 and an element-holding member 52 has a configuration different from that of the first embodiment. The element-holding member 52 includes a body 53 having a fuel passage formed in the center thereof, and a flange member 54. The body 53 and the flange member 54 are made of plastic and bonded together by snap fitting or the like. The body 53 is a dish-shaped member that has an opening at the lower side. The inner diameter of the body 53 is substantially the same as the outer diameter of the element 51. The element 51 is inserted into the body 53, and bonded to the body 53 water-tightly using an adhesive.

A fuel pipe 80 is a cylindrical member, and the upper end thereof protrudes above the top surface of the body 53, while the lower end of the fuel pipe 80 protrudes below the lower end of the element 51. The upper end of the fuel pipe 80 faces a fuel supply pipe 43. A ring-shaped first sealing material 57 is arranged around the outer periphery of the fuel pipe 80. When the upper opening of the case 30 is closed by the cap 40, the first sealing material 57 is sandwiched between the bottom surface of the cap 40 and the top surface of the element-holding member 52, thereby sealing between the fuel supply side and the fuel discharge side.

The flange member 54 is a ring-shaped member, and the bottom surface thereof is placed on the top surface of a middle stepped portion 32. When closing the opening of the case 30 by the cap 40, a ring-shaped second sealing material 58 is put on the middle stepped portion 32 of the case 30, and then, the flange member 54 is put on the middle stepped portion 32 to the inner side of the second sealing material 58. Thus, the second sealing material 58 is sandwiched between the bottom surface of the cap 40 and the top surface of the middle stepped portion 32, thereby sealing therebetween. The flange member 54 is also sandwiched between the bottom surface of the cap 40 and the top surface of the middle stepped portion 32, whereby the filter member 50 is held in position within the case 30. When the flange member 54 is sandwiched between the bottom surface of the cap 40 and the top surface of the middle stepped portion 32, the upper end of the fuel pipe 80 faces the fuel supply pipe 43. Thus, the fuel introduced from the fuel supply pipe 43 is supplied to a water reservoir 60 through the fuel pipe 80.

The outer peripheral surface of the element-holding member is provided with a flange having notches for allowing the fuel to flow therethrough. When the opening of the case is closed by the cap, the flange is held by the cap and the case. Thus, the structure for holding the filter member can be simplified, leading to further reduction in production cost. Further, it is possible to prevent the sealing material (the second sealing material 58) from being cut by excessive compression due to deformation of the case that is caused by collision (impact) and groove formation for retaining the sealing material (the second sealing material 58). Thus, fuel leakage can be prevented.

The attachment member 70 of the second embodiment is the same as that of the first embodiment. The flow of the fuel is as follows. The fuel introduced from the fuel supply pipe 43 to the diesel filter 20 as shown by arrow (1) is introduced to the water reservoir 60 through the fuel pipe 80 as shown by arrows (2). Water content of the fuel is separated from the fuel in the water reservoir 60. The fuel free from the water content moves upward in the element 51 as shown by arrows (3), so that foreign matter contained in the fuel is removed. Thereafter, the fuel passes through holes 53a formed in the body 53, and is discharged through the fuel discharge pipe 44 as shown by arrow (4).

Accordingly, since the replacement of the filter member 50 of the diesel filter 20 including the element 51 and others can be performed without removing the attachment member 70 as in the first embodiment, the replacement of the filter element 50 including the element 51 and others can be performed in a short time with reduced man-hours.

Figure 4:
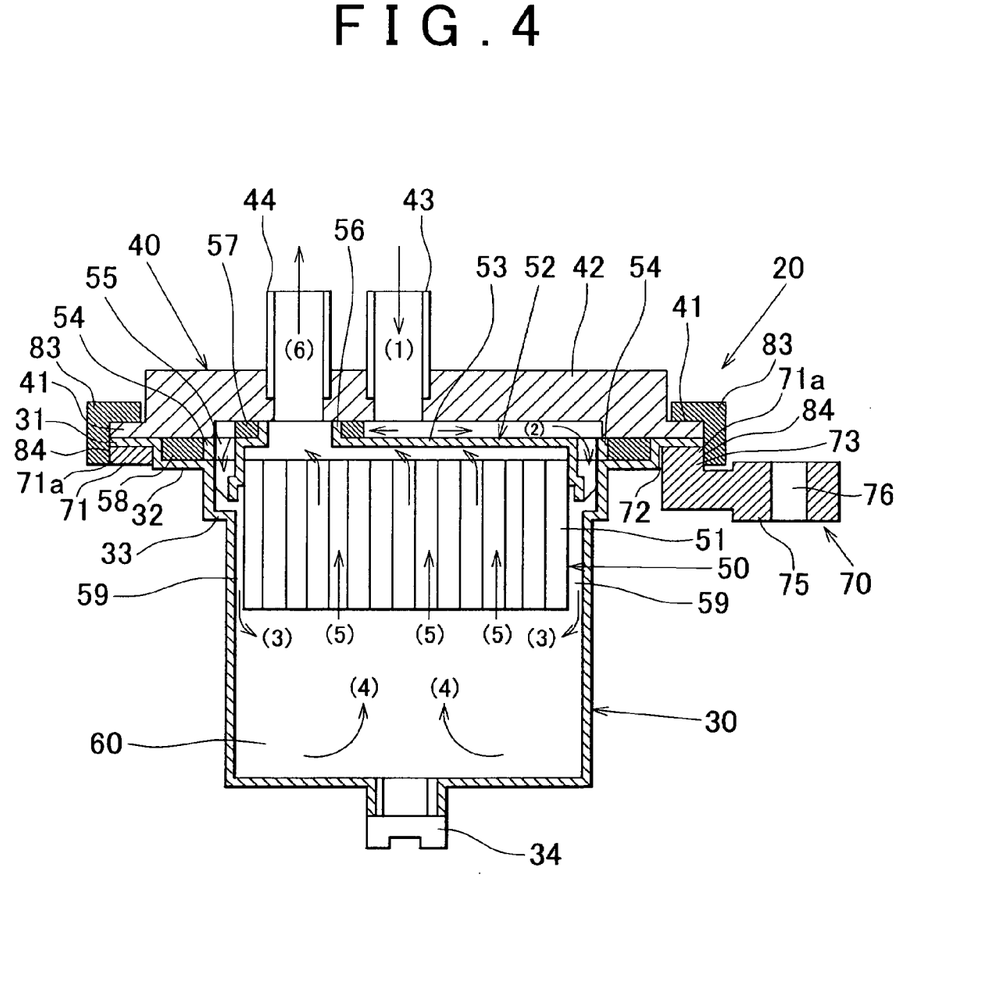
FIG. 4 is a cross sectional view of another diesel filter.

FIG. 4 is a cross sectional view showing a diesel filter according to a third embodiment. In the diesel filter of the first embodiment, fasteners are used for joining the case, the cap and the attachment member. Alternatively, threaded fastening parts are used for the joining in the second embodiment. Note that elements or members equivalent to those in the first embodiment are denoted by like reference numerals and detailed description thereof will be omitted, and a description will be mainly made of different parts.

A diesel filter 20 includes a cup-shaped case 30 forming an outer shell, a cap 40 for closing an upper opening of the case 30, a filter member 50 housed in the case 30, and an attachment member 70 for coupling the case 30 and the cap 40 and fixing the diesel filter 20 to a predetermined portion of a vehicle body, as in the first embodiment.

The configuration and structure of members different from those of the first embodiment will be described. The cap 40 includes a ring-shaped flange 41 at the outer periphery thereof, and a dish-shaped body 42 at the center thereof. The cap 40 is made of metal and hat-shaped in cross section. The cap 40 of the third embodiment is not provided with the fastening portions 45 shown in FIG. 1.

The attachment member 70 is made of metal or plastic and includes a holding portion 71, a connecting portion 73 and a bracket 75. The attachment member 70 has a forward-round and backward-square shape in top view, and is crank-shaped in longitudinal cross section. The holding portion 71 is a ring-shaped flat plate having a circular opening 72 at the center thereof. A thread 71a is formed on the outer peripheral surface of the holding portion 71, and the outer diameter of the holding portion 71 is the same as the outer diameter of the flange 41 of the cap 40 and the outer diameter of an upper stepped portion 31 of the case 30.

The bracket 75 is a generally square-shaped flat plate and placed below the holding portion 71. Two attachment holes 76 are formed at the ends of the bracket 75 on the opposite side of the holding portion 71. The connecting portion 73 connects the holding portion 71 and the bracket 75. The connecting portion 73 extends vertically, and is arc-shaped in transverse section. The attachment member 70 is fixed to a predetermined portion of the vehicle body by inserting a fastener (not shown) to each of the attachment holes 76.

The holding portion 71, the bracket 75, and the cap 40 are joined by a fastening member 83 that is reverse L-shaped in cross section. Formed on the inner surface of the vertical portion of the fastening member 83 is a thread 84 which mates with the thread 71a formed on the outer peripheral surface of the holding portion 71 of the attachment member 70.

The diesel filter 20 is assembled in the following manner. Firstly, the filter member 50 is inserted into the case 30, and the cap 40 is then put on the case 30 in the same procedure as in the first embodiment. After the cap is put on the case 30, the fastening member 83 is inserted from above the cap 40. The thread 84 formed on the inner surface of the fastening member 83 is tightened to the thread 71a formed on the outer peripheral surface of the holding portion 71, so that the three members, i.e., the cap 40, the case 30 and the attachment member 70, are simultaneously and water-tightly joined together. The use of the fastening member 83 enables the three members to be joined together in one process. Thus, the replacement of the filter member 50 can be performed in a short time with reduced man-hours, resulting in a further reduction in production cost.

Figure 5:
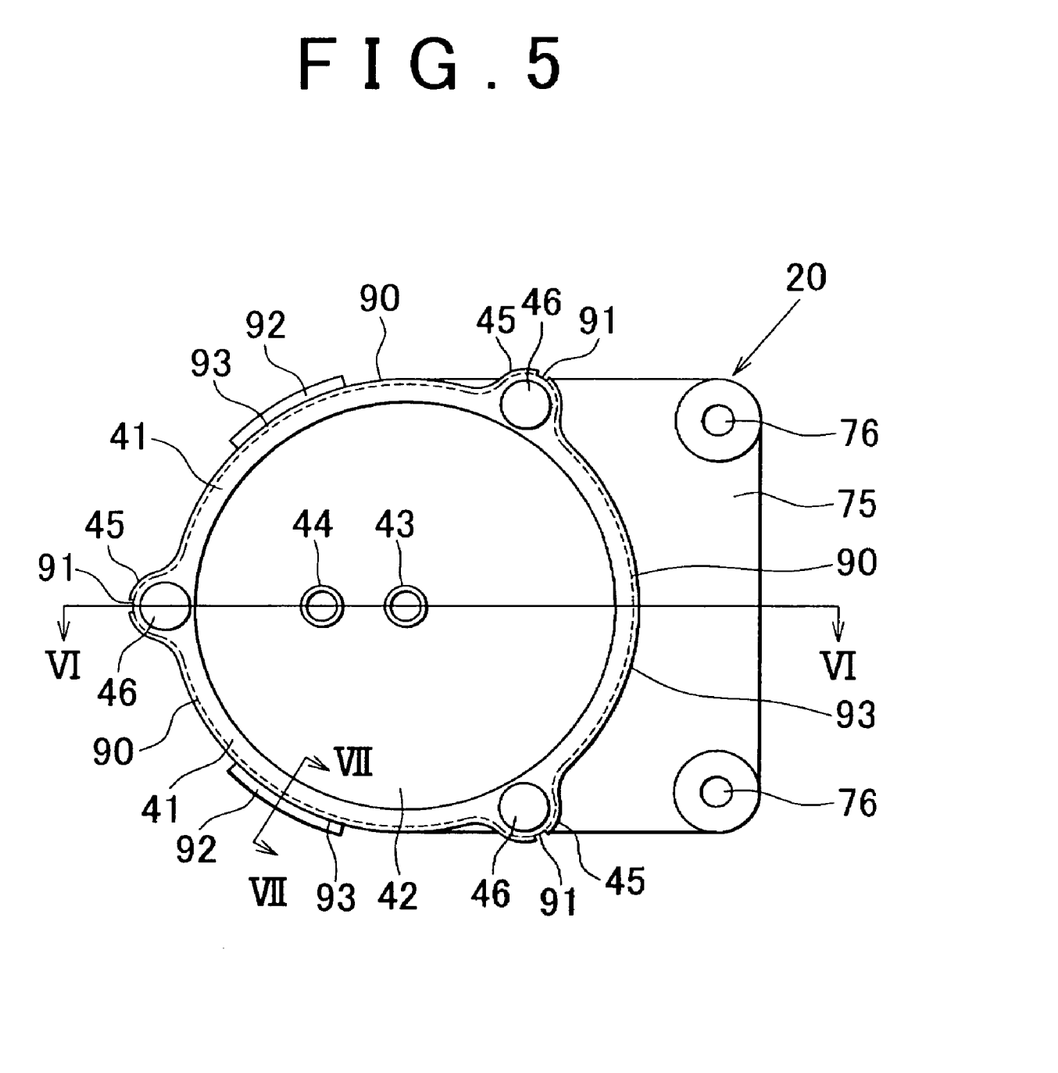
FIG. 5 is a cross sectional view of another diesel filter.
Figure 6:
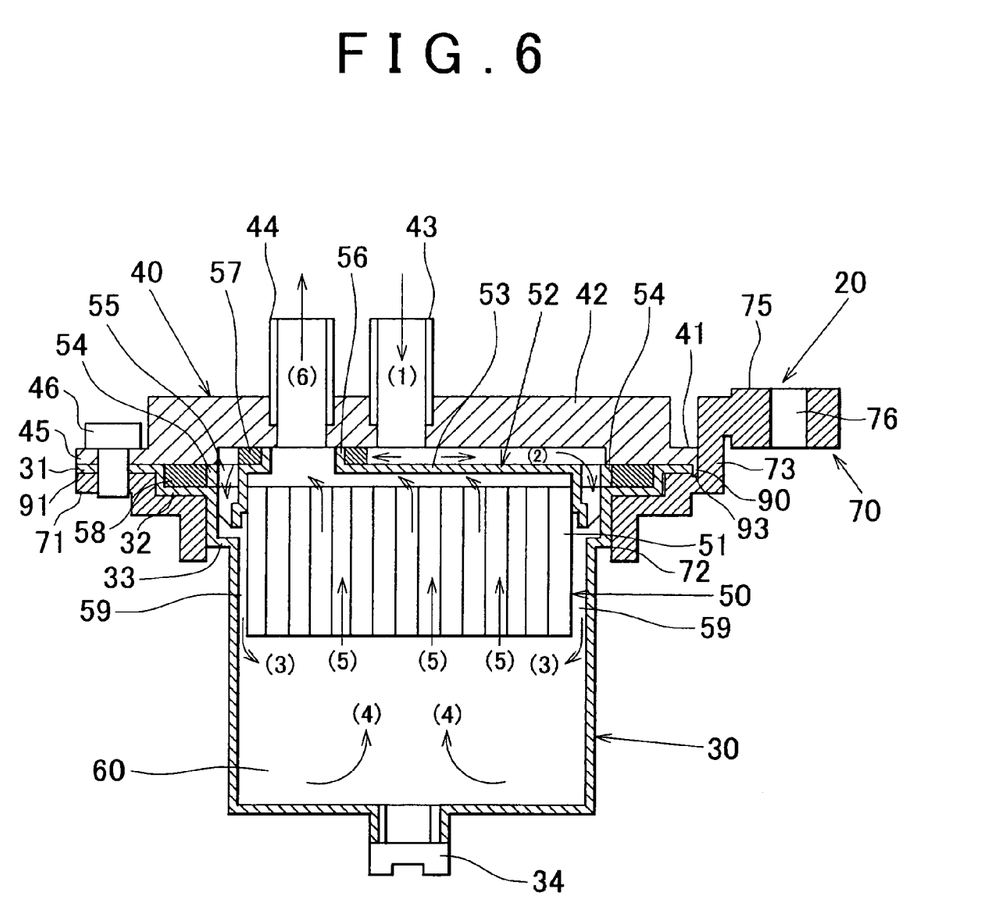
FIG. 6 is a cross sectional view taken along line VI-VI in FIG. 5.
Figure 7:
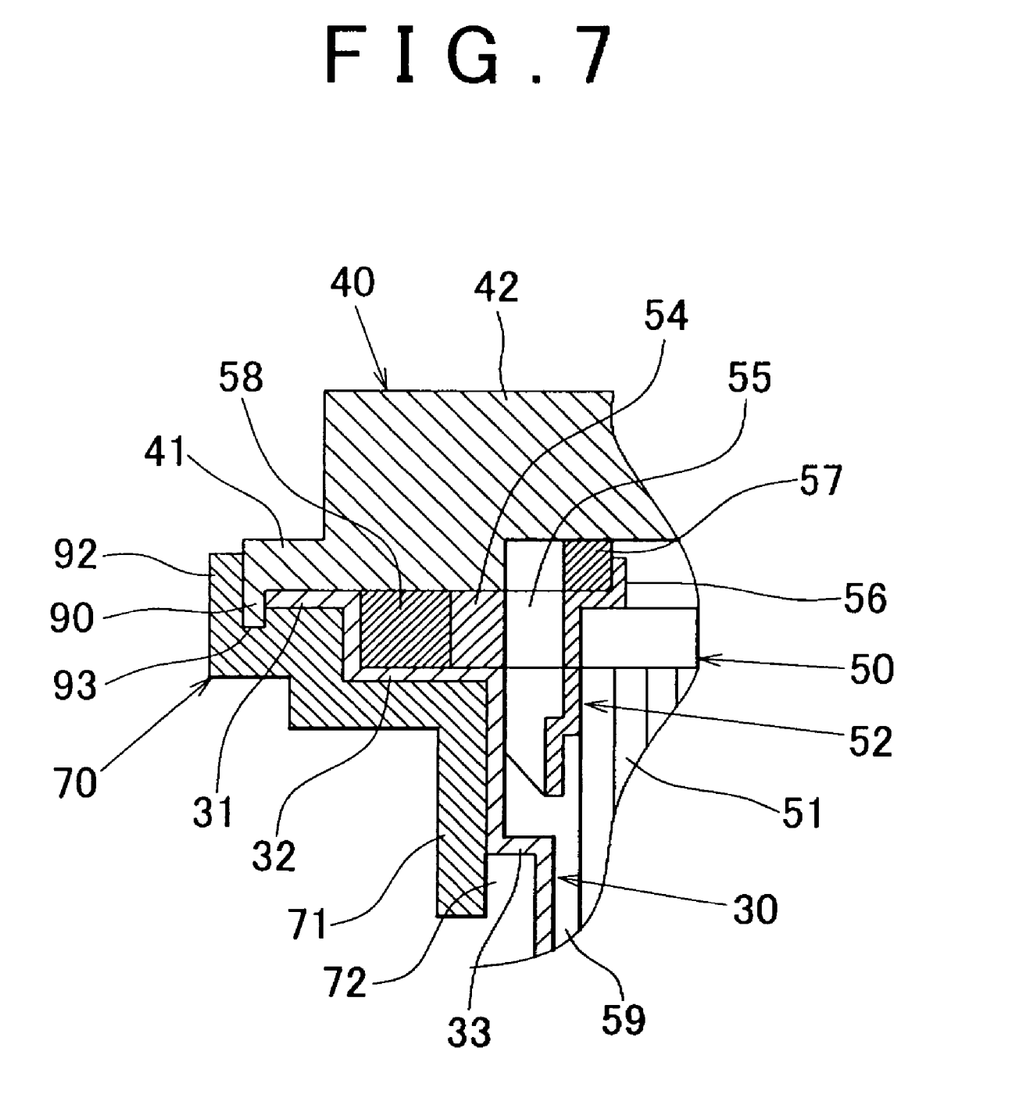
FIG. 7 is a cross sectional view taken along line VII-VII in FIG. 5.

FIGS. 5 to 7 are cross sectional views showing a diesel filter according to a fourth embodiment. More specifically, FIG. 5 is a cross sectional plan view of the diesel filter, FIG. 6 is a cross sectional view taken along line VI-VI in FIG. 5, and FIG. 7 is a cross sectional view taken along line VII-VII in FIG. 5. The diesel filter of the fourth embodiment is different from that of the first embodiment in that: the attachment member includes a guide portion for facilitating the attachment member of the cap, and a reinforcing wall for protecting the case; the cap includes, at the outer peripheral edge thereof, a water-intrusion preventing wall; and so forth. Note that the case, the filter member, and others, that are equivalent to those in the first embodiment are denoted by like reference numerals and detailed description thereof will be omitted, and a description will be mainly made of different parts.

A diesel filter 20 includes a cup-shaped case 30 forming an outer shell, a cap 40 for closing an upper opening of the case 30, a filter member 50 housed in the case 30, and an attachment member 70 for coupling the case 30 and the cap 40 and fixing the diesel filter 20 to a predetermined portion of a vehicle body, as in the first embodiment.

The cap 40 is a metallic member having a hat-shaped cross section. The cap 40 includes a ring-shaped flange 41 at the outer periphery thereof, and a dish-shaped body 42 at the center thereof. On the top surface of the body 42, a fuel supply pipe 43 and a fuel discharge pipe 44 are provided. Fuel in a fuel tank (not shown) is supplied through the fuel supply pipe 43, and filtered fuel is fed to a fuel injection pump (not shown) through the fuel discharge pipe 44.

The ring-shaped flange 41 is formed with three fastening portions 45 each having an attachment hole as shown in FIG. 5. Fasteners 46 are inserted into the attachment holes in the fastening portions 45 and tightened to the attachment member 70.

A water-intrusion preventing wall 90 extends downwardly from the bottom of the entire outer peripheral edge of the cap 40, and therefore is generally ring-shaped. The water-intrusion preventing wall 90 is cut off at the tip, i.e., the outer peripheral end, of each of the fastening portions 45, so that notches 91 are formed. The notches 91 are utilized to visually confirm whether the cap 40 is correctly attached after the cap 40 has been fastened by the fasteners 46. Note that, although the cap 40 is made of metal in the above description, the cap 40 may be made of plastic.

The attachment member 70 is made of metal or plastic and includes a holding portion 71, a connecting portion 73 and a bracket 75. The attachment member 70 has a forward-round and backward-square shape in top view, and is crank-shaped in longitudinal cross section. The holding portion 71 has a circular opening 72 at the center thereof. More specifically, the holding portion 71 is a tubular portion that opens in the upper and lower sides thereof, and has a crank-shaped cross section. Being thus formed, the holding portion 71 fits to the bottom surface of an upper stepped portion 31 of the case 30, the bottom surface of a middle stepped portion 32, and the side surface of a lower stepped portion 33. The bracket 75 is a generally square-shaped flat plate and placed above the holding portion 71. Two attachment holes 76 are formed at the ends of the bracket 75 on the opposite side of the holding portion 71. The connecting portion 73 connects the holding portion 71 and the bracket 75. The connecting portion 73 extends vertically, and is arc-shaped in transverse section. The attachment member 70 is fixed to a predetermined portion of the vehicle body by inserting a fastener (not shown) to each of the attachment holes 76.

The holding portion 71 is crank-shaped as described above so as to hold the bottom surface of the upper stepped portion 31, the bottom surface of the middle stepped portion 32, and the side surface of the lower stepped portion 33 of the case 30. Thus, the holding portion 71 can hold the case 30 in a more stable manner and also protect, when impact is applied to the case 30, corresponding portions of the bottom surface of the upper stepped portion 31, the bottom surface of the middle stepped portion 32, and the side surface of the lower stepped portion 33 of the case 30. That is, the holding portion 71 constitutes a reinforcing wall.

As shown in FIG. 5, two arc-shaped guide portions 92 are provided so as to protrude outward from the side surface of the holding portion 71. The guide portions 92 adjust the position of the cap 40. When closing the opening of the case 30 by the cap 40, the guide portions 92 guide the cap 40 so that the cap 40 is easily put in position.

Provided in the peripheral portions of the attachment member 70 where the holding portion 71 and the connecting portion 73 are continuously arranged and where the holding portion 71 and the guide portion 92 are continuously arranged are grooves 93 to which the water-intrusion preventing wall 90 of the cap 40 can be fitted, as shown in FIGS. 6 and 7. In a state where the case 30 is closed by the cap 40, at the peripheral portions of the attachment member 70 where the holding portion 71 and the connecting portion 73 are not continuously arranged, the water-intrusion preventing wall 90 extends downwardly such that it covers the outer peripheral surface of the holding portion 71. Meanwhile, at the peripheral portions of the attachment member 70 where the holding portion 71, the connecting portion 73 and the guide portion 92 are continuously arranged, the water-intrusion preventing wall 90 is fit to the grooves 93. With this arrangement, water is prevented from entering the case 30.

The diesel filter 20 is assembled in the following manner. Firstly, the case 30 is inserted to the opening 72 formed in the holding portion 71 of the attachment member 70 so that the bottom surface of the upper stepped portion 31, the bottom surface of the middle stepped portion 32, and the side surface of the lower stepped portion 33 of the case 30 are placed on, and thus contact with, predetermined portions of the holding portion 71. Secondly, a second sealing material 58 is put on the middle stepped portion 32 of the case 30, and the filter member 50 is then inserted into the case 30 such that a flange member 54 of an element holding-member 52 is fit on the middle stepped portion 32. Thereafter, a first sealing material 57 is put on the outer periphery of an opening 56 for fuel outlet of the element-holding member 52, and the cap 40 is inserted along the guide portions 92 to close the case 30. The water-intrusion preventing wall 90 is fit to the grooves 93 at the portions provided with the grooves 93. After the cap 40 is put on the case 30, the fasteners 46 with threads are attached to the fastening portions 45 of the flange 41.

In the holding portion 71 of the attachment member 70 are formed threaded holes to which the fasteners 46 are tightened. As the fasteners 46 are tightened, the upper stepped portion 31 of the case 30 is clamped between the flange 41 of the cap 40 and the holding portion 71 of the attachment member 70, whereby the case 30 and the cap 40 are water-tightly attached to the attachment member 70. In this manner, the diesel filter 20 is assembled. Whether the fasteners 46 are correctly attached can be visually confirmed by observing the positions of the notches 91. Note that the positions of the notches 91 are not limited to those where the fasteners 46 are present as shown in FIG. 5, but may alternatively be any other positions as long as whether the fasteners are correctly attached can be visually confirmed.

The replacement of the filter member 50 of the diesel filter 20 including the element 51 and others can be performed without removing the attachment member 70 as in the first embodiment. Accordingly, the replacement of the filter element 50 including the element 51 and others can be performed in a short time with reduced man-hours.

Figure 8:
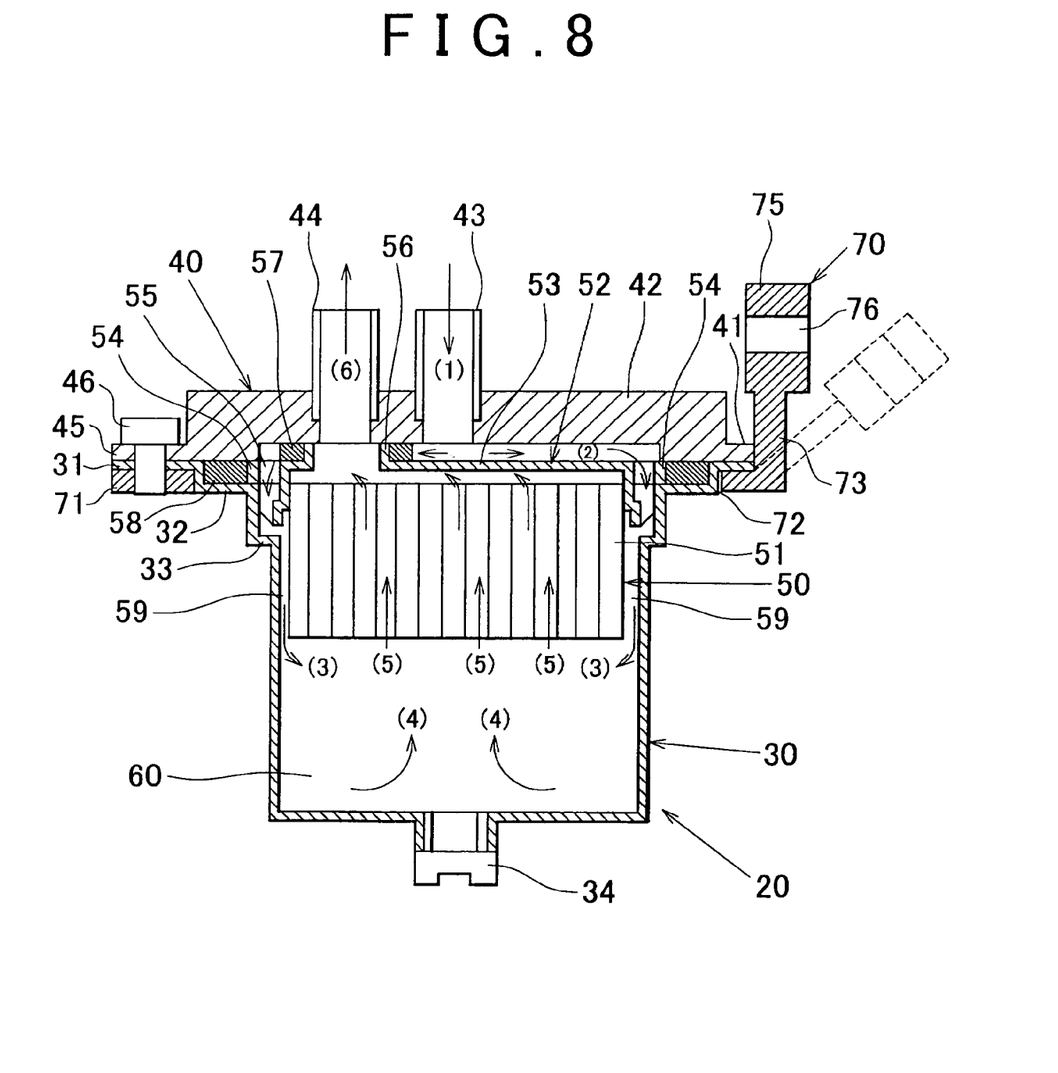
FIG. 8 is a cross sectional view of another diesel filter.

FIG. 8 is a cross sectional view showing a diesel filter according to a fifth embodiment. In the first to fourth embodiments, the holding portion 71 and the connecting portion 73 of the attachment member 70 are right-angled, while in the fifth embodiment, they are not right-angled so as to change the angle between the holding portion and the bracket. The use of such an attachment member with which the angle between the holding portion and the bracket can be changed increases flexibility in attaching the diesel filter to the vehicle.

Figure 9:
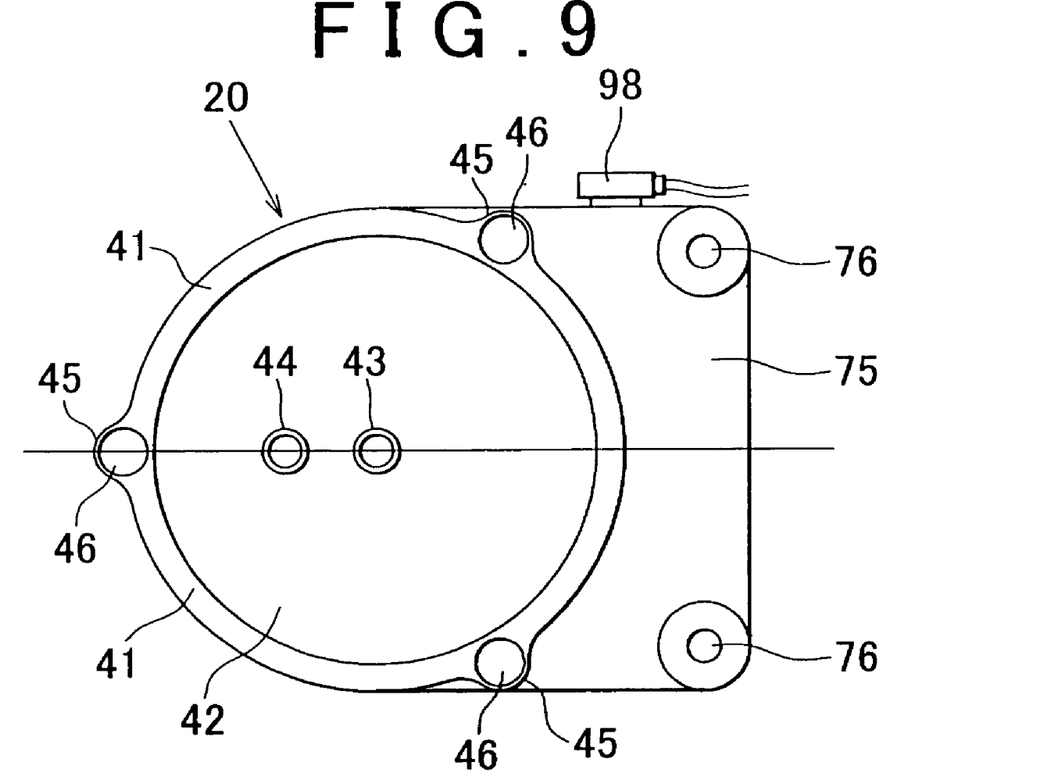
FIG. 9 is a cross sectional view of another diesel filter.

FIG. 9 is a cross sectional view showing a diesel filter according to a sixth embodiment. In a water reservoir 60, a level detector (not shown), to which a wiring member including a connector, a harness, or the like, is connected, is provided for detecting the volume of water. In the sixth embodiment, a connector of the wiring member is attached to the attachment member. Note that elements or members equivalent to those in the first embodiment are denoted by like reference numerals and detailed description thereof will be omitted.

A diesel filter 20 includes a cup-shaped case 30 forming an outer shell, a cap 40 for closing an upper opening of the case 30, a filter member 50 housed in the case 30, and an attachment member 70 for coupling the case 30 and the cap 40 and fixing the diesel filter 20 to a predetermined portion of a vehicle body, which are the same as those in the first embodiment.

A connector 98, which is a part of the wiring member, is detachably provided on a side wall of a bracket 75 of the attachment member 70, using connecting means such as a thread, a snap fit or the like. Therefore, when replacing the filter member 50 of the diesel filter 20 including an element 51 and others, the connector 98 as well as the attachment member 70 does not need to be removed. Accordingly, the replacement of the filter element 50 including the element 51 and others can be performed in a short time with reduced man-hours. Note that the connector 98 may be detachably provided in a holding portion 71.

What is claimed is:

1. A diesel filter comprising:
   a case including an opening in an upper side;
   a cap that closes the opening of the case;
   a filter member housed in the case; and
   an attachment member including a holding portion that holds a part of the case, and a bracket which is connected with the holding portion and via which the diesel filter is fixed to a predetermined portion, wherein
   the part of the case is sandwiched between the holding portion and the cap and the cap is detachable from the holding portion;
   the cap has a fuel supply pipe and a fuel discharge pipe;
   the filter member includes an element and an element-holding member for holding the element;
   the element-holding member has an opening which connects to the fuel discharge pipe where a fuel discharged from the filter member passes; and
   a fastening member that fastens the attachment member, the case, and the cap in a state where the case is sandwiched between the attachment member and the cap.

2. The filter according to claim 1, wherein
   the cap can be attached and detached so that the filter member can be inserted to and removed from the case in a state where the attachment member is fixed to the predetermined portion via the bracket.

3. The filter according to claim 1, further comprising
   a wiring member that is attached to the attachment member.

4. The filter according to claim 1, wherein
   the element-holding member is sandwiched between the case and the cap.

5. The filter according to claim 1, wherein;
   the element-holding member includes a flange which is provided at an outer periphery of the element-holding member and which includes openings through which the fuel flows, and
   the flange is held by the cap and the case in a state where the opening of the case is closed by the cap.

6. The filter according to claim 1, wherein
   the fastening member is inserted into and fixed in a through hole formed through the attachment member, the case, and the cap.

7. The filter according to claim 1, wherein
   the holding portion constitutes a reinforcing wall that covers at least a part of an outer peripheral surface of the case.

8. The filter according to claim 1, wherein
   the holding portion includes a guide portion that guides the cap to a predetermined portion of the holding portion when closing the opening of the case by the cap.

9. The filter according to claim 1, wherein
   the cap includes a wall that prevents water from entering the case in a state where the case is sandwiched between the cap and the holding portion.

10. The filter according to claim 9, wherein
    a notch is formed at a portion of the wall.

* * * * *